May 7, 1963 A. L. DE FINA ET AL 3,089,003

PRESET CALL TRANSMITTER

Filed Aug. 12, 1960 5 Sheets-Sheet 1

INVENTORS A. L. DeFINA
A. C. KELLER

BY Joseph C. Redmond, Jr.

ATTORNEY

INVENTORS A. L. DeFINA
A. C. KELLER
BY Joseph C. Redmond, Jr.
ATTORNEY

INVENTORS A. L. DeFINA
A. C. KELLER
BY Joseph C. Redmond, Jr.
ATTORNEY

PRESET CALL TRANSMITTER

Filed Aug. 12, 1960 5 Sheets-Sheet 4

INVENTORS A.L. DeFINA
A.C. KELLER
BY Joseph C. Redmond, Jr.
ATTORNEY

PRESET CALL TRANSMITTER

Filed Aug. 12, 1960

INVENTORS A. L. DE FINA
A. C. KELLER
BY Joseph C. Redmond, Jr.
ATTORNEY

United States Patent Office 3,089,003

Patented May 7, 1963

3,089,003

PRESET CALL TRANSMITTER

Angelo L. De Fina, Brooklyn, and Arthur C. Keller, Bronxville, N.Y., assignors to Bell Telephone Laboratories, Incorporated, New York, N.Y., a corporation of New York Filed Aug. 12, 1960, Ser. No. 49,264
6 Claims. (Cl. 179—90)

This invention relates to telephone substation apparatus and, more particularly, to preset call transmitters.

The development of reliable electronic and other types of switching systems for the telephone industry has required a whole new family of telephone substation apparatus to utilize fully the many advantages and features of such switching systems. As one example, substations have been developed which generate multifrequency signals, in contrast to direct current pulses, to signal a called station from a calling station. A substation of this type is disclosed in L. A. Meacham and L. Schenker application Serial No. 743,434, assigned to the same assignee as that of the present invention, and is an attempt to match the signaling time of the substation to the rapid operating time of the electronic or other types of switching system.

Various improvements have been made to substation apparatus generating multifrequency signals to reduce their signaling time, but the operating time of present day switching systems still remains considerably faster than that of such apparatus. Experience has indicated, however, that a preset call transmitter adapted to generate multifrequency signals can be designed to have a signaling time which substantially approximates the operating time of the new switching systems. Matching the signaling time of the substation to the operating time of the switching system has numerous advantages to both the subscriber and the telephone operating company. In the case of the subscriber a preset transmitter which generates multifrequency signals shortens the interval in placing a call as well as reduces dialing errors to the subscriber since a visible check can be made of the called number before transmission thereof. In the case of operating companies, a preset call transmitter requires less switching equipment to handle calls than conventional multifrequency telephone substations due to the reduced signaling time of the former device.

An object of the present invention is a preset call transmitter for multifrequency signaling.

Another object is a preset call transmitter adapted to display easily a telephone number and simultaneously define mechanically each digit of the telephone number in a coding system, typically a two-out-of-five code.

A specific object is a compact preset call transmitter which translates sequentially a telephone number encoded in mechanical form into multifrequency signals corresponding to the mechanically encoded telephone number.

These objects are accomplished in accordance with the present invention, one illustrative embodiment of which comprises a plurality of manually controlled selectors or number wheels for displaying a subscriber number desired to be called, each of said selectors being adapted to define mechanically any digit from zero to nine in a coding system, typically a two-out-of-five coding system. A signal generator including a plurality of tapped connections for producing discrete signals has access to said selectors through an array of conductors. Associated with each selector is disk or pressure plate means for connecting the selectors to the signal generator to control the output thereof in accordance with the position of the selectors. A manually-operated mechanical motor is adapted to drive means for operating sequentially each of said pressure plate means and switching means for connecting the signal generator output to a telephone line.

A feature of the present invention is a plurality of selectors or number wheels which cooperate with a multifrequency oscillator circuit to select at least two oscillator frequencies for each selector, the frequency combination uniquely defining each position of the selectors.

Another feature is means for providing a plurality of selectors with common access to a multifrequency oscillator circuit and sequentially connecting said selectors to said oscillator circuit.

Still another feature is means for connecting and disconnecting properly a multifrequency oscillator to a telephone line while a subscriber number mechanically encoded is translated one digit at a time into multifrequency electrical signals analogous to the mechanically encoded subscriber numbers.

Further objects and features of the present invention will be more fully apprenhended from the following detailed description taken in conjunction with the appended drawing in which.

Figures 1, 2:
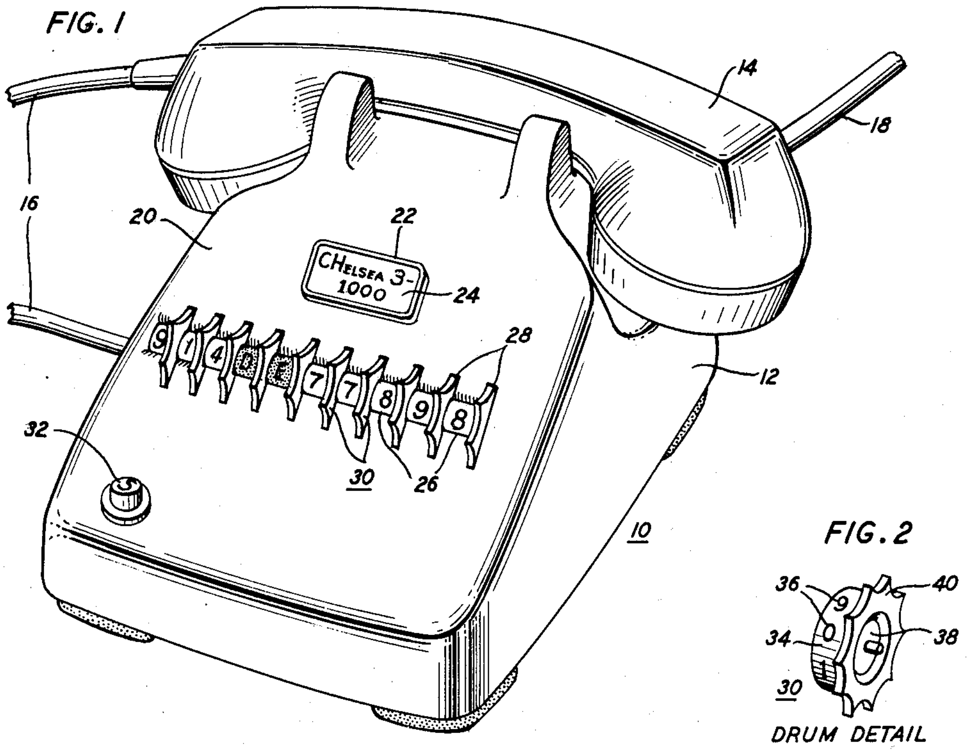
FIG. 1 is a perspective showing of a telephone set including a preset calling mechanism illustrative of the present invention.
FIG. 2 is a perspective view of a selector or number wheel included in FIG. 1.

Referring to FIG. 1 a telephone set 10 incorporating the principles of the present invention includes a base 12 and a handset 14 joined by the usual handset cord 16 and connected to a telephone line TL (see FIG. 10) by a line cord 18. The speech elements of the set 10 are all of a conventional type well known to the art. On the sloping front wall 20 of the base, in the place normally occupied by a rotary telephone dial, is a panel 22 having a station-identification card 24 therein and an elongated opening 26 having a plurality of side branches 28 through which segments of ten digit wheels or selectors 30 protrude. The number of digit wheels is not necessarily limited to ten, but may be more or less depending upon the number of digits desired to be transmitted. Ten digit wheels have been selected for reasons of convenience only and since the nationwide numbering plan is ordinarily based on ten digits.

As one alternative to the shape of the base, the sloping front wall may be curved near the elongated opening to expose a greater portion of each digit wheel segment thereby facilitating rotation of the digit wheels. Also the portion of the base between the side branches 28 may be translucent to display the digits on either side of the indicated digits. As a consequence, the subscriber will be able to select the preferred directions for rotating the digit wheels to the desired positions.

The base of the telephone set includes additionally a pushbutton 32 at the lower left corner of the base which, as will be hereinafter explained, will be used to initiate the actual calling signal transmission after setting up the digits on the digit wheels. The pushbutton 32 is labeled with the indicia S, indicative of the word "Send."

A representative digit wheel 30 may be seen in FIG. 2. Each digit wheel includes a drum portion 34 upon which are imprinted a plurality of indicia 36, to wit, the digits from zero through nine, a planar central disk 38 and a flange portion having a plurality of concave finger recesses 40. The ten digit wheels 30 provide the necessary elements for setting up either local or direct dialed toll calls. Where only three digit numbers are required, as in the case of reaching an operator at a toll center, blank spaces are provided on the drums to prevent transmission of an unnecessary number by the transmitter.

In the embodiment shown in FIG. 1, the calling mechanism is arranged to call the number DE 7–7898 in the area 914. Counting from the first digit wheel on the left in FIG. 1 the fourth through sixth digit wheels, which are for the local exchange area code, have a distinctive background color as indicated by the shading to distinguish them from the initial three wheels, which are for the area code number in the nationwide dialing plan, and the succeeding seventh through tenth number wheels, which are for the last digits of the subscriber's number.

Figure 3:
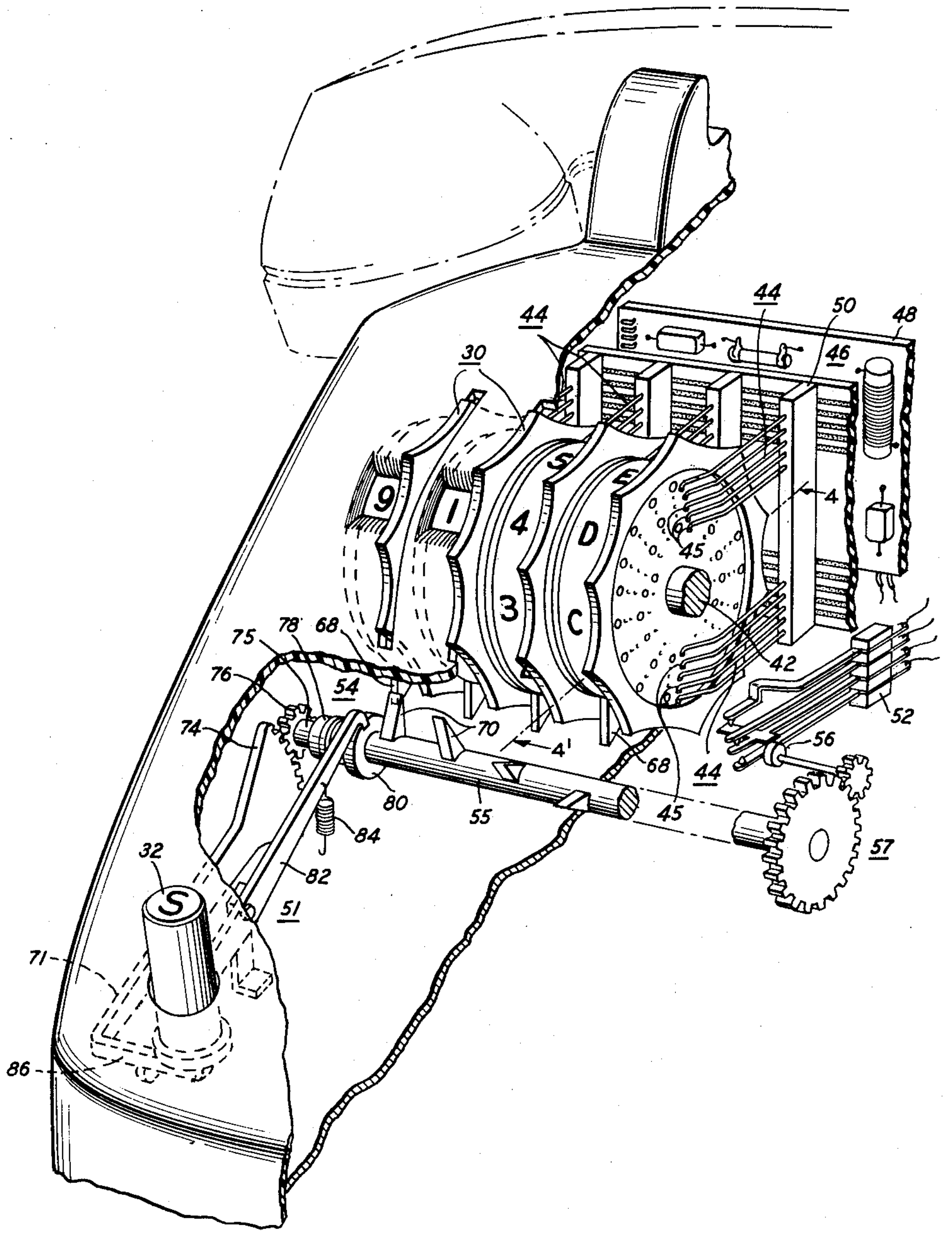
FIG. 3 is a perspective view of the telephone substation shown in FIG. 1 with portions broken away showing the preset calling mechanism and selectors included therein.

Referring to FIG. 3, the selector wheels 30 are shown assembled within the base of the telephone set, the selectors being rotatably mounted on a fixed shaft 42 suitably mounted within the base. Cooperating with each selector wheel is a conductor array 44 which provides access to a transistor oscillator circuit 46 mounted on a printed circuit board 48 or other means. The conductor array is connected to the transistor oscillator 46 through a bus bar panel 50 suitably positioned within the base. Also cooperating with the selector assembly is a manually operated mechanical motor 51 controlled by the pushbutton 32 and adapted, as will be explained hereinafter, to drive an auxiliary shaft assembly 54 and a rotary switch 52 for connecting properly the transistor oscillator to the telephone circuit (not shown).

Figure 4:
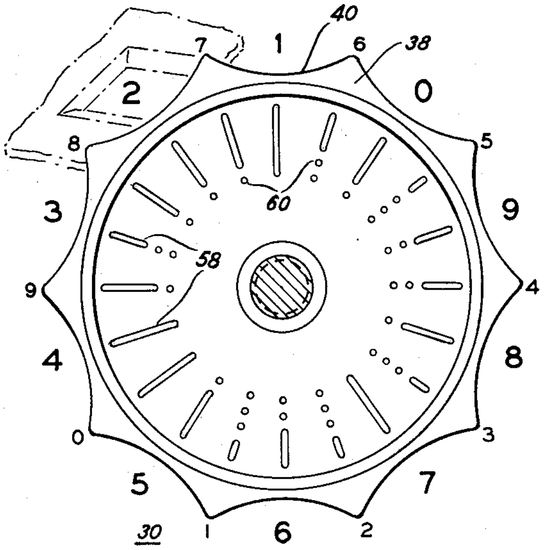
FIG. 4 is a side view along the line 4—4′ of a selector shown in FIG. 3.
Figure 9:
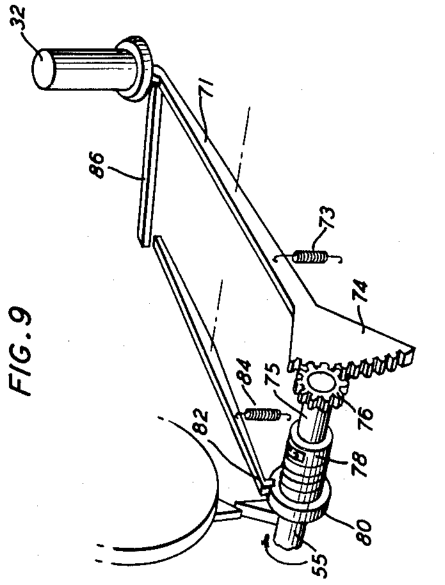
FIG. 9 is a perspective view of an operating mechanism for the auxiliary operating shaft shown in FIG. 8.

The specific details of the preset calling mechanism shown in FIGS. 1 and 3 may be more clearly understood by referring to FIGS. 4 through 9. Turning now to FIG. 4, the details of a single digit wheel or selector 30 are illustrated, the digit wheel including in the central or disk portion thereof a plurality of spring wire bridging contacts 58. Each contact extends between a respective two of five aligned holes 60. Twenty sets of such holes extend radially near the periphery of the disk portion. The bridging contacts are also twenty in number with two oppositely disposed bridging contacts forming a combination for each digit which, as will be explained hereinafter, determines the signaling frequencies of the particular digit.

Adjacent each finger recess 40 of the digit wheel is the indicia associated therewith and in the position shown the indicium two is schematically represented as being exposed through the base of the telephone set. The combination of bridging contacts which define the digit two is the contact adjacent the indicia and the contact adjacent the number two located at the junction between the recesses for the indicia six and seven. The former or uppermost contact for the indicium two bridges the first and fourth holes whereas the latter or bottom contacts bridge between the first and second holes. It is believed apparent that with a different indicium exposed through the base, a different combination of bridging contacts defines the indicium. The following tabulation, designated Table I, shows the contacts with the holes bridged for each digit:

*Table I*

| Digit No. | Bridged Holes at Top of Digit Wheel | Bridged Holes at Bottom of Digit Wheel |
|---|---|---|
| 1 | 1 and 5 | 1 and 2 |
| 2 | 1 and 4 | 1 and 2 |
| 3 | 1 and 3 | 1 and 2 |
| 4 | 1 and 5 | 1 and 3 |
| 5 | 1 and 4 | 1 and 3 |
| 6 | 1 and 3 | 1 and 3 |
| 7 | 1 and 5 | 1 and 4 |
| 8 | 1 and 4 | 1 and 4 |
| 9 | 1 and 3 | 1 and 4 |
| 0 | 1 and 4 | 1 and 5 |

It should be noted that all of the bridging contacts extend between a number one or outermost hole and another hole in the array. As may be readily expected, the number one holes are associated with a common conductor and the other holes are associated with selected or tapped conductors of a frequency determining network in the signaling circuit.

Figure 5:
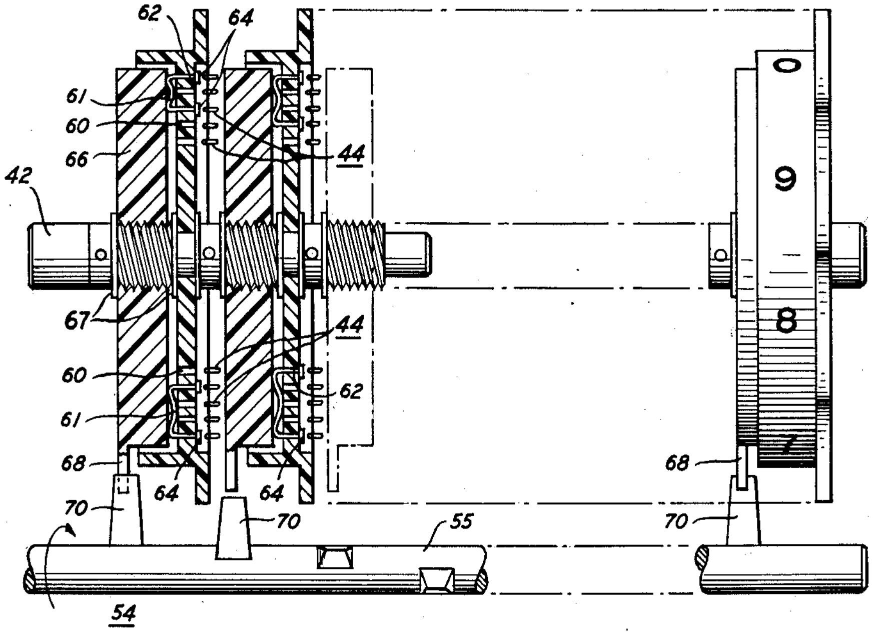
FIG. 5 is an elevational view partly in section of a portion of the selector or number wheel assembly included in the preset calling mechanism.

The digit wheels, as previously explained, are mounted on the shaft 42 within the base as shown in detail in FIG. 5. For ease of explanation and description, however, only three of the wheels are shown as being mounted on the shaft. The two left end digit wheels are shown as being sectioned through a pair of bridging contacts, the left end digit wheel for purposes of description being designated by the letter A. Examining the digit wheel A, it may be seen that the uppermost bridging contact referred to in FIG. 4 includes a reentrant spring portion 61, a pair of arms 62, one arm extending through the top of the uppermost set of aligned holes 60 and the other arm extending through the third hole of the uppermost set of aligned holes. Similarly, the bridging contact associated with the lower set of aligned holes 60 includes reentrant spring portion 61 and the arms 62, one of which extends through the second of the aligned set of holes and the other of which extends through the bottom or fifth of the aligned set of holes. This combination of bridging contacts represents the digit 9 as will be seen by referring to Table I. To retain the bridging contacts within the aligned set of holes, each arm includes a button 64 which is larger in diameter than that of the aligned hole and thereby prevents the contact from slipping out of the holes.

Adjacent the upper and lower bridging contacts are the conductor arrays 44 which include a plurality of cantilever spring elements, typically five in number. The cantilever spring elements, as will be explained hereinafter, are suitably mounted as shown in FIG. 3 and have a bent outer end 45 (see FIG. 7) which terminates adjacent to the combination of contact buttons oppositely disposed on the digit wheel.

Also mounted on the shaft 42 and associated with different digit wheels are a plurality of disks or pressure plates 66 of insulating material, the plates being threadedly engaged with the shaft 42. Collar members 67 suitably secured to the shaft hold the digit wheels in fixed relation with respect to the shaft and limit the axial travel of the pressure plates on the shaft. Each disk or pressure plate also includes a finger 68 for engaging the auxiliary shaft assembly 54 as will be described in more detail hereinafter. As will be seen from FIG. 5, the pressure plate and digit wheel assemblies are identical for each digit position indicated on the shaft, the number of digit positions in the present instance being ten as indicated in FIG. 1.

Positioned below the digit wheel or selector assembly and in parallel planar relation with the shaft 42 is auxiliary shaft 55 which is part of the auxiliary shaft assembly 54 (see FIG. 1). The auxiliary shaft 55 which is suitably journaled for 360 degree rotation about the axis thereof includes a plurality of laterally extending vanes 70 spaced around the periphery of the auxiliary shaft in 36 degree intervals. The peripheral position of each vane corresponds to the number of digits and blank spaces on the digit wheels. If each digit wheel has the same number of digits and blank spaces, the vanes are equally spaced about the periphery. If the number of digits and blank spaces are different for the digit wheels, the peripheral positions of the vanes are different and analogous to the digits and spaces on the digit wheels. Each vane is also positioned axially to engage one of the respective fingers of the pressure plates associated with the digit wheels.

Figure 6:
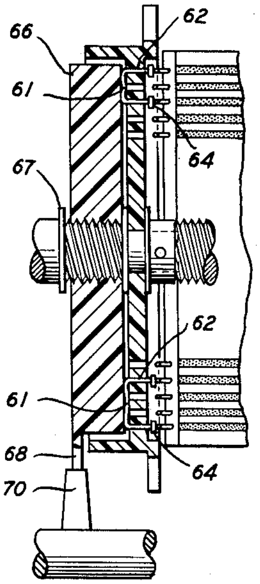
FIG. 6 is a fragmentary view of the selector assembly showing one of the selectors in the assembly in the selecting condition.

The auxiliary shaft vanes are so arranged that upon the rotation of the shaft from the normal position the disk or pressure plate fingers are sequentially engaged, as for example, starting from the left disk and proceeding to the last or furthest disk shown on the right in FIG. 5. When the rotating vane strikes the finger, the plate is rotated and axially displaced against the digit wheel associated therewith because of threading 69 on the shaft. The force of the pressure plate against the bridging contacts distorts the reentrant spring portion 61 thereof, as shown in FIG. 6, and causes the arm members 62 to move through the holes to bring the buttons 64 in contact with the matching cantilever springs. Pressure on the bridging contacts is released when the vane slips past the finger of the wheel whereupon the distorted reentrant spring portion 61 reverts to the normal shape (see FIG. 5) and in so doing simultaneously returns the pressure plate or disk to the original position and the buttons out of contact with the cantilever springs.

In the operate position of a disk, typically illustrated in FIG. 6, the arms 62 of the upper set of reentrant springs extend through the holes in the digit wheel and the contact buttons 64 close the circuit between the first cantilever spring and another cantilever spring of this set, depending upon the digit indicated on the digit wheel, for example the third cantilever spring from the top in the case of the digit 9. Similarly, for the same digit 9 the arms 62 of the lower set extend through the holes in the digit wheel and the contact buttons 64 close the circuit between the bottom cantilever spring and the fourth spring from the bottom.

Figure 7:
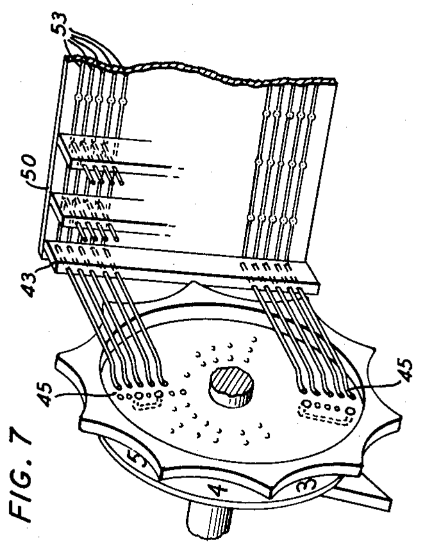
FIG. 7 is a perspective view of a selector and conductor array for connecting said selector to a multifrequency oscillator.

As shown in FIG. 7, the contact ends 45 of the cantilever springs for the top and bottom sets are in slanted relation with respect to a vertical plane in order to be aligned with the holes for the displayed indicia. Both sets of springs are secured to a bar 43 of dielectric material extending across the face of the bus bar panel 50 which is of conventional printed circuit board or other construction. The five spring elements at the top and bottom each make individual electrical contact with longitudinally extending electrical busses 53 included in the panel 50.

Figure 8:
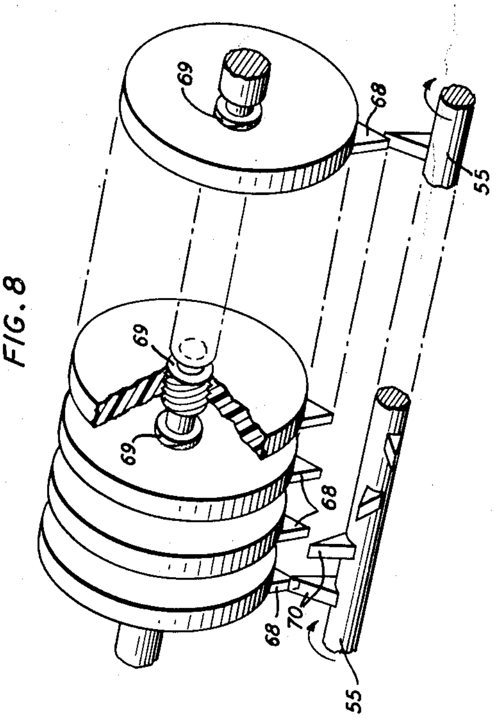
FIG. 8 is a simplified perspective showing of the selector assembly and an auxiliary operating shaft associated therewith.

In FIG. 8, the details of the disks 66 and the cooperative relationship between these elements and the auxiliary shaft may be clearly seen. The disks engage the threads 69 of the stationary shaft and all include the fingers 68 which are in alignment. The auxiliary shaft in FIG. 8 is shown in the normal "At Rest" position, from which it may be rotated 360 degrees in the sequential closing of the contacts associated with each finger wheel. The contact between a mating vane 70 of the auxiliary shaft and a finger of the pressure plate is sufficient that upon rotation of the auxiliary shaft the disk is rotated approximately ten degrees. Such rotation is sufficient due to the pitch of the threads 69 to produce about one-eighth inch of advance to the right in FIG. 8 and thereby exert force on the bridging contacts moving them into engagement with the cantilever springs. As previously mentioned, the distorted reentrant spring portion 61 urges the pressure plate away from the digit wheel after the vane slips past the mating finger.

Rotation of the auxiliary shaft may be achieved by conventional electric motor means. Also mechanical motor means may be employed as, for example, by the mechanical linkage and the spring arrangement shown in FIG. 9 which is operated by the pushbutton 32. Beneath the pushbutton, which is mounted within the base of the telephone set, is an arm 71 pivoted about an axis and carrying a sector gear 74. The arm 71 carries one end of a tension spring 73 used for returning the arm and pushbutton to the normal or rest position and hereinafter termed the motor spring since energy stored therein is used for the operation of the calling mechanism. Mating with the sector gear 74 is a spur gear 76 on an output shaft 75 which is coupled to the auxiliary shaft 55, for example, by a band clutch 78 of the type which is well known in the art allowing free movement of the driving member in one direction and positive connection between the driving (output shaft 75) and the driven (auxiliary shaft 55) elements during rotation in the opposite direction. The auxiliary shaft carries a notched collar 80 and a detent member 82, the latter arranged to be pivoted about an axis generally parallel to the axis of the arm 71. The detent is biased against the collar by a suitable spring member 84. The detent member is adapted to be released after the downward travel of the arm 71 by an overlying arm 86 connected to the arm 71.

Figure 10:
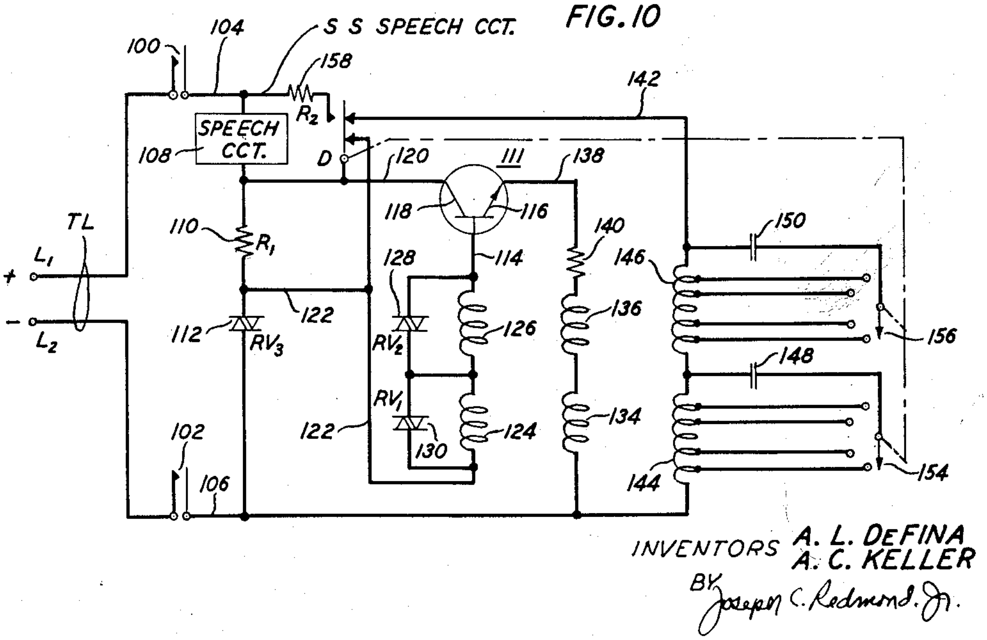
FIG. 10 is an electrical schematic representation of the signaling or oscillating circuit of the telephone set shown in FIG. 1.

The digit wheel and auxiliary shaft assemblies cooperate with a signaling circuit to translate the subscriber number displayed on the digit wheels and encoded in mechanical form into electrical signals analogous to the mechanically encoded subscriber number. The signaling circuit, shown in FIG. 10, is for two-out-of-five frequency signaling and is substantially the same as that disclosed in L. Meacham and F. West application Serial No. 759,474 assigned to the same assignee as that of the present invention. Although two-out-of-five frequency signaling is hereinafter described, it is understood, of course, that the present invention has application to other signaling systems as, for example, a one-out-of-ten frequency signaling system.

The circuit includes a pair of switchhook contacts 100 and 102 each connecting the telephone set to the telephone line TL. The set is connected to the switchhook contacts by a pair of conductors 104 and 106. Bridged across the conductors 104 and 106 is the entire speech circuit 108 of the telephone set in series with a resistor 110 and a voltage dropping symmetrical diode 112. The speech circuit is of conventional design and well known to any worker skilled in the telephone art.

A transistor 111 includes a base electrode 114, an emitter electrode 116 and collector electrode 118, the emitter-collector circuit thereof being effectively connected across the diode 112 so that both the base and collector electrodes have a bias voltage thereon equal to the voltage drop across the diode 112. The connection of the collector 118 to the diode 112 is through the first set of a pair of normally closed contacts of a transfer switch D and conductors 120 and 122. The base electrode 114 is connected to the bias diode 112 through the same conductor 122 and a pair of series windings or coils 124 and 126 which are respectively shunted by voltage limiting diodes 128 and 130. The emitter electrode is connected to the line conductor 106 by a pair of windings or coils 134 and 136, a conductor 138 and a dropping resistor 140. A branch circuit extending through conductor 142 and the second set of a pair of normally closed contacts of the transfer switch D includes a pair of windings or coils 144 and 146 in series and terminates at the line conductor 106. The windings or coils 124, 134, 144 are all on a common core and inductively coupled together. The windings or coils 126, 136 and 146 are similarly on a single core and coupled to each other. Each of the coils 144 and 146 includes five tapped connections, one of which includes series capacitors 148 and 150, respectively. Bridging contacts 58 (see FIG. 4) are represented as wipers 154 and 156 and arranged to short circuit the capacitors 148 and 150 across sections of the coils 144 and 146, respectively.

The circuit is shown in the normal nonsignaling condition with the speech circuit in condition for enablement upon the lifting of the handset and closure of switchhook contacts 100 and 102. For reasons more apparent hereinafter, mechanical coupling is necessarily included between the wipers 154 and 156, which represent the bridging contacts 58, and the transfer switch D, the coupling being indicated in the drawing by the dotted line therebetween.

In the arrangement shown, upon the closure of the switchhook contacts 100 and 102, direct current flows from the central office battery (not shown) to the speech circuit 108 thence to the transfer switch D by way of the conductor 120 and thereafter returning to the battery by way of the conductor 106 after passage through the coils 144 and 146 and the conductor 142. Direct current also flowing from the speech circuit establishes a common voltage on the base electrode 114 and the collector electrode 118 by way of the coils 124 and 126 and the transfer switch D and the conductor 120, respectively.

Upon operation of the preset call mechanism or signal control means, as will be explained hereinafter, the wipers 154 and 156 corresponding to the bridging contacts 58 are arranged for successive connection to selected taps of the coils 144 and 146 in accordance with the settings of the digit wheels. Simultaneously with the connection of the wipers to a set of selected taps the direct current path to the coils through the transfer switch D is interrupted thereby producing an oscillatory discharge between the coil 144 and the associated capacitor 148 and a similar discharge between the coil 146 and the associated capacitor 150. This discharge is inductively coupled to both the base and emitter circuits of the transistor through the mutual coupling between the respective coils. At the time of operation of the transfer switch D, the opening of the second front contact allows the voltage on the collector electrode to rise by an amount equal to the voltage across the resistor 110 thereby conditioning the transistor for amplification. The closure of the back contact of the transfer switch D provides a low impedance shunt through conductor 120 and a resistor 158 across the speech circuit in order to eliminate any interference for signaling by the speech circuit.

The oscillatory discharges in the tapped coils 144 and 146 coupled to both the emitter and base circuits of the transistor are amplified therein and introduced onto the telephone line through the resistor 158, the back contact of transfer switch D, and conductor 120. The amplitude of the amplified oscillation in each frequency is determined by the closed taps of the coils and is limited by the shunting diodes 128 and 130 appearing across coils 126 and 124, respectively.

The signaling circuit may be characterized as a dual frequency transistor oscillator which is shock-excited into oscillation by the simultaneous discharge of two tuned circuits and having the amplitude of both discharges limited so as to prevent one frequency from dominating over the other.

The signal generator circuit is controlled by the preset call mechanism shown in FIGS. 1 through 9, the mechanism being adapted to arrange bridging contacts for closing selected taps on the tuning coils of the oscillator in accordance with the numbers appearing on the digit wheel. The preset mechanism is also adapted to scan the bridging contacts in a properly timed sequence and simultaneously operate and restore the D transfer switch in the proper phase.

Having described the purpose and arrangement of the various elements of the first embodiment of the present invention, the next several paragraphs will be devoted to the operation thereof.

To operate the first embodiment, the subscriber moves the digit wheels so that the number to be called appears on the face of the telephone set. As shown in FIG. 1, a subscriber number 7898 at the exchange DE 7 in the area 914 is ready for transmission. For a call to the local area, the area digit wheels would normally be left showing the digit zero or a blank space, as the particular application desired. In so doing, the subscriber, as shown in FIG. 3, has moved each digit wheel so that two bridging contacts are now in position opposite the conductor array 44 associated with each wheel. The top conductor 19 in each of the uppermost arrays is connected through the bus board to the series capacitors 148 whereas the bottom conductor in each of the lower arrays is connected through the bus board to the capacitor 150. The remaining four conductors in each of the lower and upper arrays are connected to the taps of the coils 144 and 146, respectively. Corresponding conductors in each array are connected to corresponding taps of the coils.

After setting the number, the subscriber lifts the handset and in doing so conditions the transistor oscillator for operation by suppling direct current to it from the line conductors. Next, ordinarily dial tone is supplied to the substation from the central office thereby completing the preparations for the transmission of the preset subscriber number. Thereafter, the subscriber depresses the pushbutton 32 to send the preset subscriber number. Depression of the pushbutton rotates the arm 71 and the sector gear 74 about the pivot point thereof in the clockwise direction and against the motor spring 73 to store energy in the latter element. The sector gear drives the spur gear 76, the band clutch 78 permitting the spur gear to turn fully in the counterclockwise direction. When the pushbutton reaches the bottom of its travel, the overlying arm 86 connected to the arm 71 strikes the pawl or detent 82 which is pivoted against the restraint of spring 84 and lifted out of the notch in the collar 80 on the auxiliary shaft 55 thereby releasing the auxiliary shaft for rotation. Release of the pushbutton allows the energy stored in the motor spring to return the sector gear to the rest position which rotates the spur gear 76 in the clockwise direction. The spur gear drives the auxiliary shaft through the clutch 78 for one complete revolution until the pawl 82 falls into the notch in the collar 80. The design of the motor spring is readily selected to match the operating time of the present invention to the electronic switching equipment, or other modern equipment, with which it cooperates, thereby realizing the advantages hereinbefore mentioned.

During the period of auxiliary shaft rotation the vanes 70, as shown in FIG. 3, strike the fingers 68 on the pressure plates. As a consequence, the pressure plates, as previously pointed out, are rotated in sequence starting from the first plate on the left and proceeding to the furthest plate on the right of FIG. 3. Each plate is rotated through a minor arc and advanced on the helical threads of the stationary main shaft 42 to distort the spring portion of the bridging contacts shown in FIG. 6 such that the latter shorts each common conductor to one of the other conductors in the array, each of the other conductors, as previously mentioned, being connected to one of the taps of the coils 144 and 146. Upon shorting the common conductors to selected taps of the coils, two signaling frequencies indicative of the digit are selected.

Coupled to the auxiliary shaft 55 through a conventional speed increasing gear assembly 57, as shown in FIG. 3, is the cam operated switch 52 which includes a cam member 56 driven by the assembly 57, the switch providing the functions of the transfer switch D of FIG. 10. The mechanical design of the cam operated switch is such that each pressure plate is advanced to bridge the signal frequency determining conductors 44 prior to the operation of the transfer switch. Upon the operation of the switch D, the dual-frequency signal is generated and transferred to the telephone central office. As the vane 70 of the auxiliary shaft passes beyond the finger of the plate, the latter is urged away from the digit wheel by the spring action of the bridging contacts in returning to their original shape. As a consequence, the connections to the tapped coils 144 and 146 are opened and the signaling frequencies are terminated. Simultaneously, the switch 52 closes which connects the oscillator circuit to the telephone line for subsequent operations.

Immediately after recharging of the oscillator circuit the next vane of the auxiliary shaft moves into contact with the bridging contacts of the next digit wheel disk and the establishment of the next digit signaling frequencies and their transmission is effected. The continued rotation of the auxiliary shaft generates the remaining digits which are automatically transmitted to the telephone central office. At the completion of the single revolution of the auxiliary shaft, all of the digits set up in the mechanism are transmitted and the shaft comes to rest. Where blank spaces are set up no digits are transmitted because the vanes do not engage the fingers of the disks. The rotation of the auxiliary shaft is controlled by the weights of a conventional speed-determining governor (not shown) so that the transmitted signals are properly spaced timewise.

Figure 11:
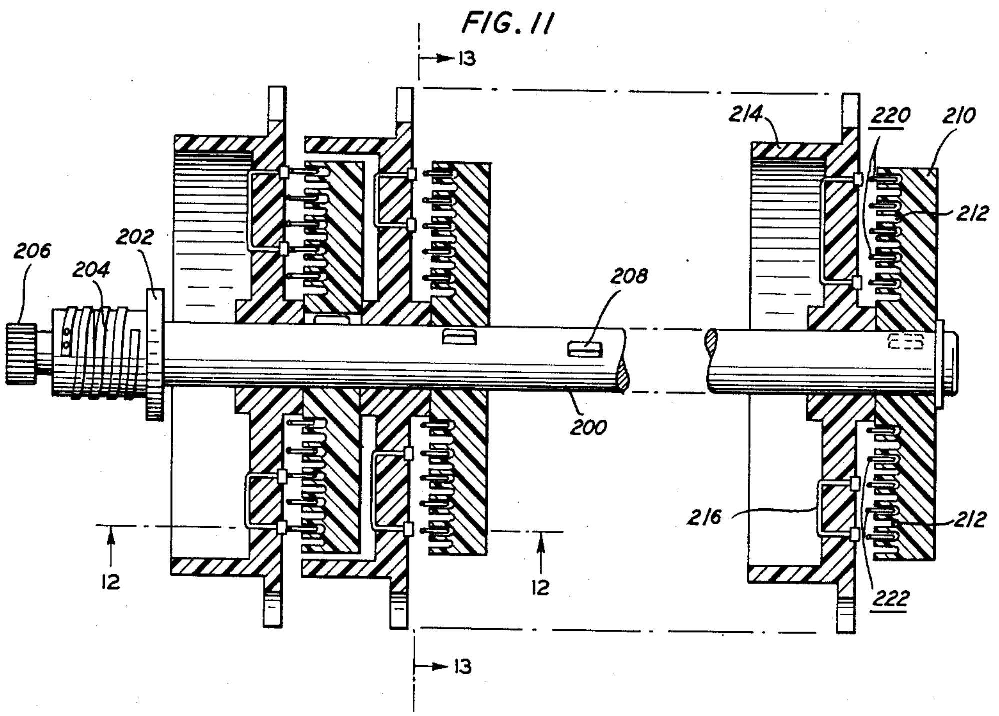
FIG. 11 is a front elevational view of another embodiment of a selector assembly included in the present invention.
Figure 13:
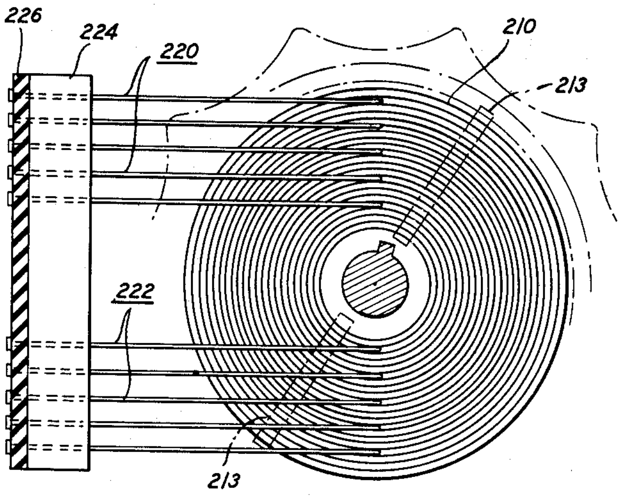
FIG. 13 is a side view along the line 12—12′ of the selector assembly shown in FIG. 11.
Figure 12:
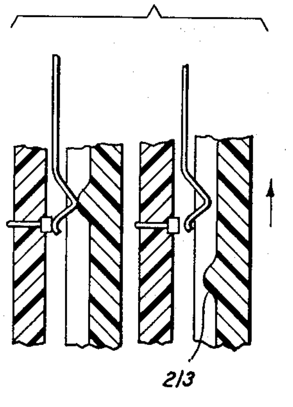
FIG. 12 is an enlarged fragmentary view along the line 12—12′ of the selector assembly of FIG. 11 showing the assembly in the operated condition.

Another form or second embodiment of the present invention is shown in FIGS. 11 through 13. The second embodiment is identical to the former embodiment with respect to the arrangement of the base, pushbutton-operated motor and signaling circuit. A new digit wheel assembly is included in the second embodiment, however, which eliminates the auxiliary shaft assembly 54 required in the first embodiment.

As shown in FIG. 11, the digit wheel assembly of the second embodiment includes a shaft 200 suitably journaled in the base (not shown) of the telephone set and connected through a collar 202 to a band clutch 204 and spur gear 206, these elements being part of a pushbutton-operated motor assembly (not shown) identical to the motor assembly 51 included in the first embodiment. The shaft 200 also includes a plurality of lugs 208 equally spaced above the periphery and along the axis of the shaft. Each lug is keyed into a disk member 210 having at least ten annular grooves 212 on one side thereof. Each of the grooves has a protuberance 213 (see FIG. 12) along a common diameter of the disk. The common diameters of the protuberances for each of the disks secured to the shaft 200 are different. Starting from the left and proceeding to the right of FIG. 11, the disks are so arranged on the shaft that in the case of ten digit wheels, as an example, the angular position of the common diameter of one disk is 36 degrees greater than the succeeding disk. Where more or less than ten digit wheels are employed, the angular relationship among the common diameters changes accordingly.

Rotatably mounted on the shaft and immediately adjacent to the grooved side of each disk is a digit wheel 214 identical to the digit wheel described in FIG. 2. Each digit wheel cooperates with two five-conductor arrays 220 and 222 identical to those described in the first embodiment. The upper set, or conductor array 220, extends into grooves of the disk starting from the groove of least diameter. The lower set, or conductor array 222, extends into the disk in alternate grooves starting from the groove of largest diameter. The conductors cooperate with a plurality of bridging contacts 216 (identical to those described in the first embodiment) included in the digit wheel 214, the bridging contacts selecting discrete conductors in each of the sets 220 and 222 in accordance with the positions of the digit wheels.

A better view of the structural relation of the conductor arrays for one of the disks is shown in FIG. 13. As shown there, the conductors are suitably embedded in an insulated bar 224 secured to a bus bar panel 226, each of the conductors of the array being connected to a different one of the bus bars included in the panel. The connections between each array and the bus bar panel and between the bus bars and the transistor oscillator circuit (not shown) also mounted on a printed circuit board or other means are the same as those described for the first embodiment.

In operation the digit wheel described in FIGS. 11 through 13 performs the same functions as those described in the first embodiment. The subscriber number is arranged for transmission to the central office by positioning the digit wheels 214 in accordance with the digits of the subscriber number. When the handset (not shown) is raised and the pushbutton motor (not shown) operated, the shaft 200 is caused to rotate for the same reasons described in the first embodiment. Rotation of the shaft 200 drives the disks 210 in synchronism, but does not disturb the digit wheels since the former are keyed to the shaft whereas the shaft is free to rotate within the latter. Also means not shown but well known in the art may be included in the present invention to lock the digit wheels in place when the shaft rotates.

As the disks rotate, the conductor arrays for each disk engage sequentially the bridging contacts of the digit wheels associated therewith. The sequential connection of the conductor arrays to the bridging contacts for each of the digit wheels is caused by the common diameter of the protuberances 213 on each disk. When the common diameter of the protuberances is in alignment with the bent ends of the conductor arrays (see FIG. 12), the bridging contacts are connected to the transistor oscillator circuit. As in the case of the first embodiment, two of the five conductors in each array are engaged by the bridging contacts to complete the connections to the oscillator circuit. One of the connections in each array is a common connection and the other connection is to one of the taps of the tuning coil. The frequencies associated with the taps are transmitted to the central office to define the digit indicated by the digit wheel. After the common diameter of protuberances slips past the conductor array, the connection completed by the bridging contact is released and the transfer switch D operates to charge the oscillator for the next digit transmission. Shortly thereafter the protuberances of the next grooved disk, which is displaced about 36 degrees or other suitable value from the preceding disk, engage the cantilever springs and interconnect the bridging contacts with the latter and thereby select the frequencies of the oscillator circuit for transmission to the central office in accordance with the digit designation of that digit wheel. This process is repeated until frequencies corresponding to each of the digits indicated on the digit wheels have been transmitted to the central office. Upon completion of the last digit transmission the shaft 200 returns to the original position and the pushbutton-operated motor (not shown) is ready for the next sending operation.

The second embodiment shown in FIGS. 11 through 13 has the advantage of eliminating the auxiliary shaft assembly 54 described in connection with the first embodiment which should reduce the manufacturing cost of the present invention. It also eliminates threading the shaft to permit axial movement of the pressure plates or disks in engaging the bridging contacts which further simplifies the present invention and should reduce the cost thereof.

In view of the foregoing, applicants have disclosed a preset call transmitter for multifrequency signaling which is rapid and accurate in operation and of relatively low cost. Call transmitters of the type disclosed herein, as previously indicated, offer advantages to both the subscriber and the operating companies.

Numerous other embodiments of the present invention may be made by those skilled in the art without departing from the spirit and scope of the present invention.

What is claimed is:

1. A preset telephone calling mechanism comprising a plurality of manually controlled digit wheels, each digit wheel including a plurality of bridging contacts for establishing the digits of a telephone number to be called in accordance with the position of the digit wheel, a signal generator including a plurality of tapped connections for producing discrete signals, an array of conductors having common access to said digit wheels connected to said tapped connections, a disk member associated with each of said digit wheels, each of said disk members comprising means for connecting the bridging contacts of its associated digit wheel to said conductor array to complete the signaling circuit of said signal generator, manually controlled motor means for initiating the transmission of signaling information, and means driven by said motor means for imparting rotary motion to each of said disk members in sequence thereby actuating said connecting means to cause the bridging contacts of each digit wheel to complete in sequence the signaling circuit of the signal generator.

2. A preset telephone calling mechanism comprising a plurality of manually controlled digit wheels rotatably mounted on a fixed shaft, each digit wheel including a plurality of bridging contacts for establishing the digits of a telephone number to be called in accordance with the positions of the digit wheels, a disk member threadably secured to the fixed shaft adjacent to each digit wheel, each disk member including a finger which when subjected to a force of proper direction causes the disk member to translate along the shaft a predetermined length, a signal generator including a plurality of tapped connections for producing discrete signals, an array of conductors having common access to said digit wheels connected to said tapped connections, and motor means for urging the disk members in sequence toward the digit wheels to cause the bridging contacts thereof to become connected to said array of conductors and thereby complete the signaling circuit of said signal generator whereby multifrequency signals corresponding to the digits of the telephone number indicated by the positions of the digit wheels are transmitted sequentially.

3. A preset telephone calling mechanism comprising a plurality of manually controlled digit wheels rotatably mounted on a fixed shaft, each digit wheel including a plurality of bridging contacts for establishing the digits of a telephone number to be called in accordance with the positions of the digit wheels, a disk member threadably secured to the fixed shaft adjacent to each digit wheel, each disk member including a finger which when subjected to a force of proper direction causes the disk member to translate along the shaft a predetermined length, an auxiliary shaft in parallel relation with respect to the fixed shaft, said auxiliary shaft including a plurality of vanes spaced about the periphery thereof, said vanes positioned on said auxiliary shaft to be in alignment with the fingers of said disk members, a signal generator including a plurality of tapped connections for producing discrete signals, an array of conductors having common access to said digit wheels connected to said tapped connections, and motor means for driving the auxiliary shaft to subject the fingers of the disk members to a force which urges the disk members in sequence toward the bridging contacts of the digit wheels associated therewith to cause said bridging contacts to become connected to said array of conductors and thereby cause completion of the signaling circuit of said signal generator whereby multifrequency signals corresponding to the digits of the telephone number indicated by the positions of the digit wheels are transmitted sequentially.

4. A preset calling mechanism comprising a plurality of manually controlled digit wheels, each digit wheel including a plurality of bridging contacts for establishing the digits of a telephone number to be called in accordance with the positions of the digit wheels, a disk member associated with each digit wheel, each disk member including a plurality of annular grooves therein along the side adjacent to the digit wheel, a common diameter of protuberances in the grooves of each disk member, the common diameters of protuberances for succeeding disks being different from each other and all other disk members, a signal generator including a plurality of tapped connections for producing discrete signals, an array of conductors connected to said tapped connections and extending into said annular grooves, said conductors being adapted to be connected to the bridging contacts by said protuberances, and motor means for initiating the transmission of signaling information and sequentially rotating the disks relative to the digit wheels, whereby said protuberances cause said bridging contacts to become connected to said array of conductors, thereby causing the completion of the signaling circuit of said signal generator and the sequential transmission of multifrequency signals corresponding to the digits of the number indicated by the positions of the digit wheels.

5. A preset telephone calling mechanism comprising a plurality of manually controlled digit wheels rotatably mounted on a shaft, each digit wheel including a plurality of bridging contacts for establishing the digits of a telephone number to be called in accordance with the positions of the digit wheels, a disk member keyed to the shaft associated with each of the digit wheels, each disk member including a plurality of annular grooves on the side thereof adjacent to the digit wheel, a common diameter of protuberances included in the grooves of each disk, the common diameters of succeeding disks on the shaft being a proportion of 360 degrees greater than the preceding disk according to the number of digit wheels, a signal generator including a plurality of tapped connections for producing discrete signals, an array of conductors extending into said annular grooves and being connected to said tapped connections, and motor means connected to said shaft for initiating the transmission of signaling information and sequentially rotating the disk members relative to the digit wheels, whereby said protuberances cause said bridging contacts to become connected to said array of conductors and complete the signaling circuit of said signal generator and multifrequency signals corresponding to the digits of the telephone number indicated by the positions of the digit wheels are transmitted sequentially.

6. The preset telephone calling mechanism in accordance with claim 1 wherein said manually controlled motor means comprises a segment gear connected to a pivoted arm member, said arm member being biased against rotation in one direction by a motor spring, a pushbutton for engaging said arm member to cause rotation thereof against the biasing action of said motor spring, a spur gear engaging said segment gear and connected to an output shaft through a band clutch which permits rotation of the spur gear in one direction without rotation of the output shaft, and pawl means for preventing rotation of said output shaft while said spur gear is rotated, said pawl means being actuated by said pushbutton at the end of its travel to release said output shaft.

References Cited in the file of this patent

UNITED STATES PATENTS

| | | |
|---|---|---|
| 2,358,586 | Newell | Sept. 19, 1944 |
| 2,799,729 | Lovell | July 16, 1957 |
| 2,861,130 | Yanagida | Nov. 18, 1958 |
| 2,880,278 | Vandenberg | Mar. 31, 1959 |